United States Patent [19]

Keefe

[11] 4,236,067

[45] Nov. 25, 1980

[54] AUTOMATIC SWEEP CIRCUIT

[75] Inventor: Donald J. Keefe, Lemont, Ill.

[73] Assignee: The United States of America as represented by the United States Department of Energy, Washington, D.C.

[21] Appl. No.: 961,153

[22] Filed: Nov. 16, 1978

[51] Int. Cl.³ ................................. H03K 21/36
[52] U.S. Cl. .................. 235/92 PB; 235/92 CC; 235/92 CA; 235/92 PE
[58] Field of Search ............ 235/92 PB, 92 T, 92 CC, 235/92 CA, 92 NT, 92 CV, 92 MT; 340/347NT; 328/109, 110

[56] References Cited

U.S. PATENT DOCUMENTS

| | | |
|---|---|---|
| 3,651,486 | 3/1972 | Abrahamsson .................. 235/92 PB |
| 4,032,756 | 6/1977 | Jezo ................................ 235/92 PB |
| 4,053,738 | 10/1977 | Besenfelder et al. ............ 235/92 PB |

*Primary Examiner*—Joseph M. Thesz
*Attorney, Agent, or Firm*—James E. Denny; Frank H. Jackson; Paul A. Gottlieb

[57] ABSTRACT

An automatically sweeping circuit for searching for an evoked response in an output signal in time with respect to a trigger input. Digital counters are used to activate a detector at precise intervals, and monitoring is repeated for statistical accuracy. If the response is not found then a different time window is examined until the signal is found.

6 Claims, 4 Drawing Figures

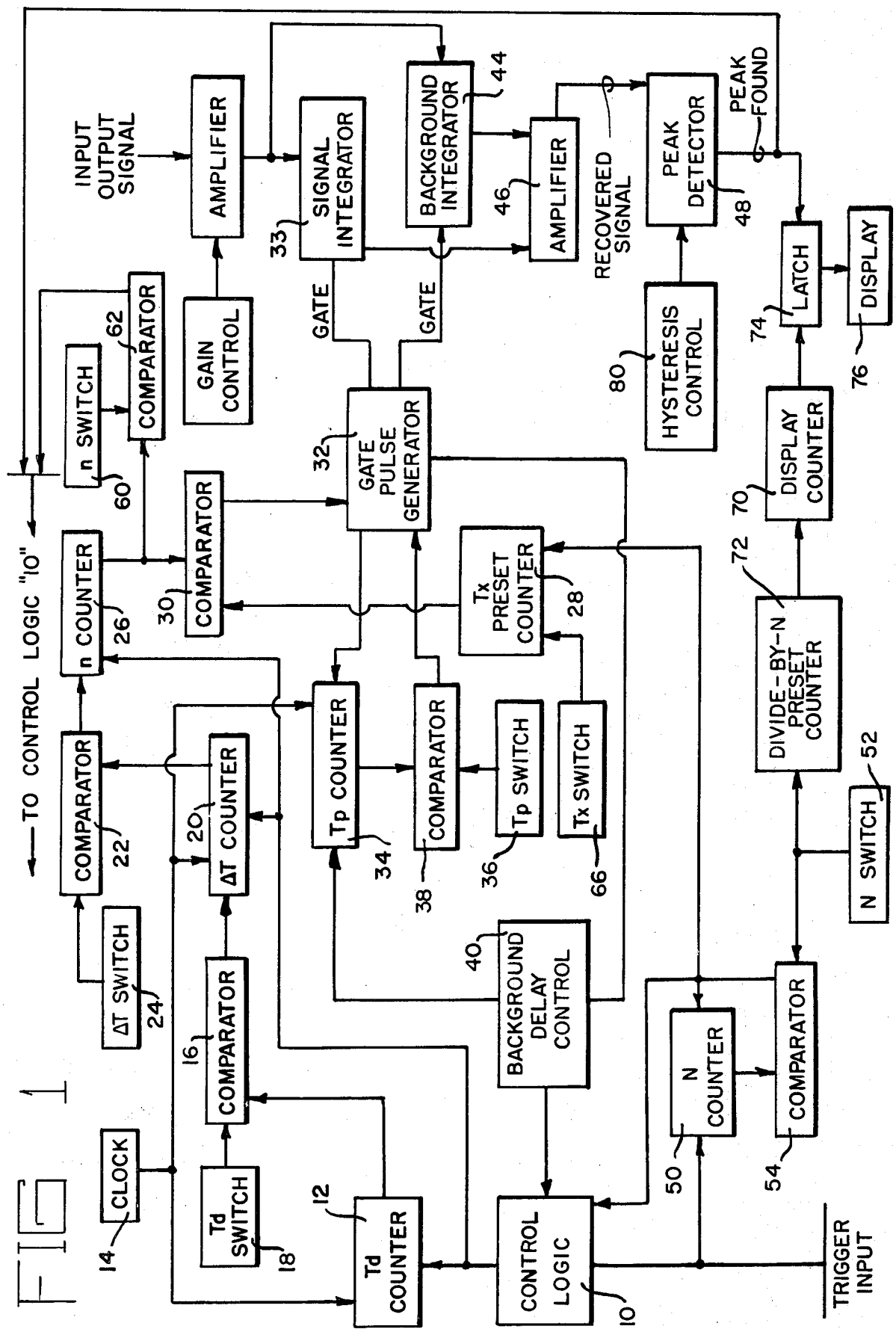

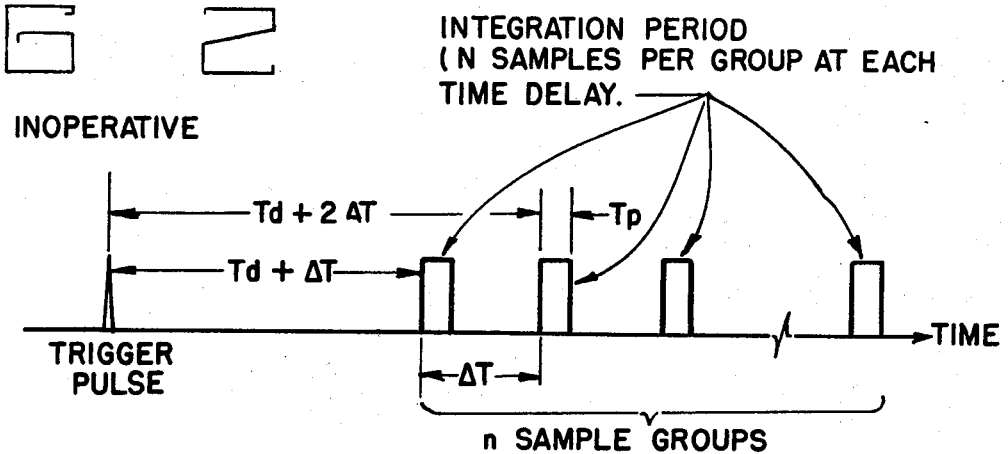
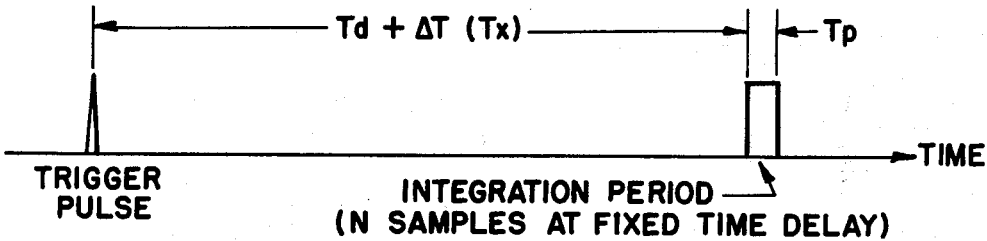
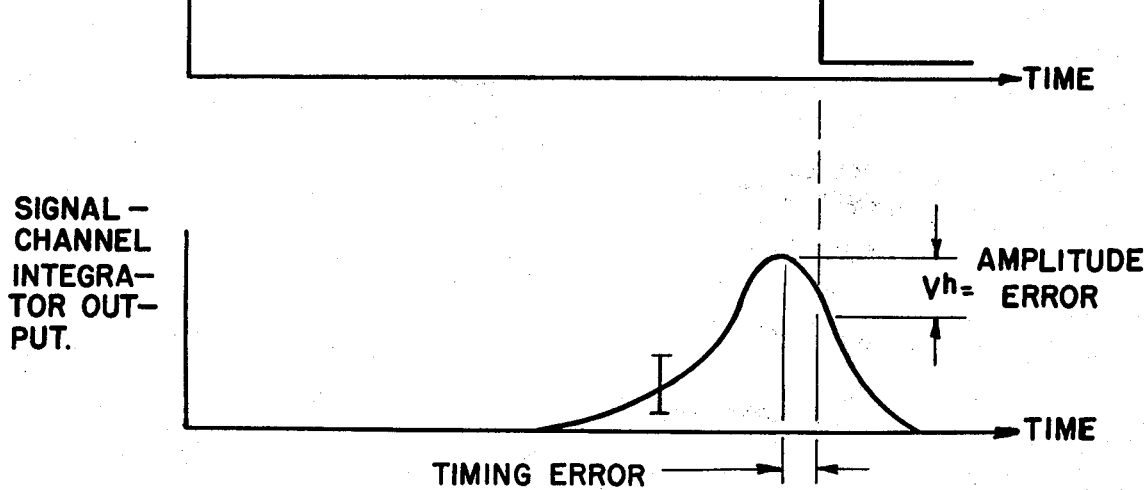

AUTOMATIC SWEEP CIRCUIT

CONTRACTUAL ORIGIN OF THE INVENTION

The invention described herein was made in the course of, or under, a contract with the UNITED STATES DEPARTMENT OF ENERGY.

BACKGROUND OF THE INVENTION

Some experimental applications require that a repetitive voltage wave form be extracted from random electrical noise, sometimes from DC off-set drifts. Such applications include measurements of pulsed nuclear resonance, laser excitation delay, ultrasonic echoes and other evoked-response phenomena. It is known that a boxcar integrator may be able to recover such a signal buried in random electrical noise by repeatedly sampling the signal plus noise at an appropriate time delay sampling the signal plus noise at an appropriate time delay after the trigger pulse which initiates the evoked response. When many such samples are integrated, the random noise will tend to integrate to zero. The output signal-to-noise ratio will be improved compared to the input signal to noise ratio by a factor approximately equal to the square-root of the number of samples taken. If a slow DC drift causes errors, a dual-channel boxcar integrator, also called a time domain difference amplifier, is usually used with one channel providing the signal plus DC information and the other channel providing just the DC information. By subtracting the one signal from the other, the signal information is obtained.

In ultrasonic echo detection the information to be recovered includes the time delay between the trigger and the signal pulse or pulses, which is a function of some parameter of interest as well as the signal pulse amplitude. A manual search for the signal each time that the time delay changes may then become a very time-consuming effort, susceptible to error. To perform such a search, the operator must set the time delay of the boxcar integrator and wait while a number of integrations are taken. If the signal is not found, the time delay must be manually changed and a new set of samples must be integrated. This must be repeated until the signal is found. Even if operator errors are neglected, the time and operator attention required minimize the possibility of making such measurements efficiently. Prior art boxcar integrators with a sweep capability are available, but they do not provide the precise time interval or signal amplitude measurements needed.

It is therefore an object of this invention to provide an automatically sweeping circuit for searching for a signal response in an output signal which is evoked in response to a trigger input.

Another object of this invention is to provide an automatically sweeping boxcar integrator to automatically search for echoes hidden in noise.

SUMMARY OF THE INVENTION

An automatically sweeping circuit for locating the signal pulse or pulses evoked by an input trigger signal is provided. Such a device may be used in an ultrasonic echo detection system. A clock is used to develop a pulsed output which is counted after the trigger input initiates the count. This trigger input also initiates the examination of the output signal for the desired response which lasts until a predetermined count is reached. The device then waits for the next trigger input and begins the cycle all over again. This is repeated for N number of times. In addition, the circuit provides for time delay of initiation of the examination of the output and for automatically moving the time period of examination to a later time period if the signal is not located during the first sweep of N examinations.

BRIEF DESCRIPTION OF THE DRAWINGS

FIG. 1 is a block diagram of the automatically sweeping circuit:

FIG. 2 and FIG. 3 are timing diagrams showing the operation of the circuit: and

FIG. 4 is a response diagram showing signal detection by the circuit.

DETAILED DESCRIPTION OF THE INVENTION

Referring to FIG. 1 there is shown a block diagram of the automatically sweeping circuit for detecting an output signal evoked by a trigger input. In the embodiment shown in FIG. 1 the circuit is shown in combination with a boxcar integrator and is particularly adaptable for detection of ultrasonic echoes. It is understood that this circuit, however, may be used with any evoked response detection system. In operation, a pulse trigger input such as an ultrasonic signal evokes a response in an output signal. This output signal may have a large noise component and it is necessary to detect both the time of the response echo with respect to the trigger pulse and the amplitude of the response. Trigger pulses are usually repeated due to the difficulty in detecting the evoked response. When the first trigger pulse occurs, control logic 10 responds to the trigger input to enable $T_d$ counter 12. When enabled, $T_d$ counter 12 begins to count clock pulses from clock 14. This will determine an initial time delay. Comparator 16 compares the count of $T_d$ counter 12 with the predetermined value applied by $T_d$ switch 18. When the value inputted by switch 18 is reached by counter 12, comparator 16 enables $\Delta T$ counter 20. $\Delta T$ counter 20 will determine the time separation between successive sample groups, and when enabled begins counting pulses from clock 14. Comparator 22 compares the count of $\Delta T$ counter 20 with that predetermined by $\Delta T$ switch 24. When the count is equal to that of $\Delta T$ switch 24 that indicates that a time period $\Delta T$ has passed, and comparator 22 then enables n counter 26. n counter 26 counts the number of times that comparator 22 indicates that $\Delta T$ counter 20 equals the input from $\Delta T$ switch 24. Therefore after the first T, n counter 26 will have a count of 1. The count of n counter 26 is compared to the value in the $T_x$ preset counter 28 by comparator 30. As will be described, in the sweep mode, $T_x$ counter 28 has been preset to the value 1. Since the value of $T_x$ counter 28 is 1 and that of n counter 26 is 1, comparator 30 sends a signal to gate pulse generator 32 indicating that an integration sample should now be taken. In response to the signal from comparator 30, gate pulse generator 32 enables signal integrator 33 and $T_p$ counter 34. When enabled, signal integrator 33 begins integration of the output signal and $T_p$ counter 34 begins counting pulses from clock 14. When $T_p$ counter 34 accumulates the same number of counts as set on $T_p$ switch 36, the preset integration time has passed. Comparator 38 determines this time period and will stop gate pulse generator 32 from enabling the signal integrator 33. In this embodiment the gate pulse generator also starts an analogue timer 40 at the beginning of signal integration gate to create a variable additional time delay between the signal and background channel sample times. During the initial $T_p$ time period signal integrator 33 integrates the output signal and after the time period $T_p$, gate pulse generator 32 enables background integrator 44, and background control 40 resets $T_p$ counter 34 to count a new time period for the background count. Background integrator 44, during this second $T_p$ period, integrates the output signal at a delayed time sufficient to insure no signal pulse in the evoked response. This integrated output contains only the background DC offset magnitude, which is then subtracted by amplifier 46 from the magnitude of the previous integrated signal resulting in a voltage proportional to only the desired signal. Difference amplifier 46 subtracts the output of background integrator 44 from that of signal integrator 33 and the recovered signal should be an indication of the output signal less background. Peak detector 48 examines this recovered signal for the evoked response. In this way a signal sample of width $T_p$ is taken at a time delay $T_d$ plus $\Delta T$ after a trigger pulse and a background sample is taken with a width equal to $T_p$ but delayed an additional time period after the signal sample.

After each background sample is taken by background integrator 44, control logic 10, in response to a sample completion signal from background control 40, resets the $T_d$ counter 12, the $\Delta T$ counter 20 and the n counter 26 and waits for the next trigger pulse. When this trigger pulse occurs, the counting sequence explained above is repeated so a second sample pair is taken with the same time delays as the first sample pair. However, each trigger pulse is also counted by N counter 50, which determines the number of samples per sample group. When the accumulated value in the N counter 50 reaches the value set on the N switch 52, comparator 54 resets the N counter and also increments the value of $T_x$ counter 28. On the following trigger pulse, the $T_d$ counter 12 and $\Delta T$ counter 20 measure the delay $T_d + \Delta T$ as before. But this time the accumulated value in n counter 26, which was one, is not equal to the value in $T_x$ counter 28 which is now 2, so that the $T_p$ counter 34 is not immediately enabled by comparator 30 through generator 32. Rather, after the $\Delta T$ counter 20 reaches the value set by $\Delta T$ switch 24 it resets itself and continues counting. When the $\Delta T$ counter 20 value equals the $\Delta T$ value 24 for the second time, the n counter 26 is incremented to 2, and the $T_p$ counter 34 is enabled because the value in the $T_x$ counter 28 equals the value in the n counter 26. Signal and background samples are then taken again. A signal sample is therefore taken at a time delay $T_d + 2\Delta T$, with a background sample further delayed as before. This continues until N samples have been taken at the time delay $T_d + 2\Delta T$, at which time the $T_x$ counter 28 increments to 3 and the process repeats. In this way an incrementing of the $T_x$ counter generates the sweep of the sample and background counting times.

The sweep continues until either a peak in the difference amplifier 46 output is detected by peak detector 48 or the $T_x$ counter is incremented to the value input by n switch 60. This is determined by comparator 62. If no peak is detected, n counter 26 will then count up to the value of n switch 60, at which time the comparator 62 output will terminate the automatic sweep via control logic 10. In this case, a total of n sample groups consisting of N samples is taken, starting at $T_d + \Delta T$ separated by $\Delta T$.

Fixed-mode operation can also be accomplished. In this mode only one sample group is taken at a time delay which is determined by the operator. This mode is similar to that of conventional circuit. In fixed-mode, the operator can decide to integrate at any of the sample groups that can be integrated automatically in the sweep mode. The $T_x$ switch 66 is set to the time position number of the sample group desired. If the fifth sample group of the sweep is desired, the switch 66 is set to 5. $T_x$ counter 28 is automatically preset to this value before the timing operations begin. When a trigger pulse is detected, the timing procedure is exactly as in the sweep mode, except that the first $T_x - 1$ sample groups are skipped since the $T_x$ counter never contains these values. Only the $T_x$ sample is taken with the time delay at $T_d + (\Delta T)T_x$. Since only one sample group is desired, the output of comparator 54 associated with N counter 50 is used to terminate the integration through control logic 10 rather than to increment the $T_x$ counter as in the sweep mode. The end of the sweep pulse produced by comparator 62 is also disabled so that in the fixed mode the n switch 60 has no effect on circuit operation.

Referring to FIG. 2 there is more particularly shown the timing provided by the automatic sweeping circuit. In the search mode, the instrument generates a time delay equal to $T_d + \Delta T$ following the first trigger pulse. At the end of this delay, the signal channel integration window is held open for a time period equal to $T_p$. This process is repeated with each trigger pulse until N samples have been integrated at this time delay. Then the instrument integrates a series of N more samples at the time delay $T_d + 2\Delta T$ following the trigger pulse. If no signal peak is found this process would continue until n such samples of N samples each have been taken, but with each sample group delay increased by $\Delta T$ from the previous sample group delay. The sweeping circuit control then will have searched through the time delay $T_d + \Delta T$ to $T_d + n\Delta T$, integrating N times each delay. The input variables, which are applied to switches, control the time durations and are summarized in the following Table I.

TABLE I

| PARAMETER | FIG. 1 SWITCH NO. | MEANING |
|---|---|---|
| N | 52 | Number of samples per channel integrated at each time delay, i.e., the number of samples per sample group. |
| $T_d$ | 18 | Time delay between the trigger pulse and the beginning of a sweep. |
| $\Delta T$ | 24 | Time separation of successive sample groups within a sweep. |
| n | 60 | Maximum number of sample groups taken during a sweep. This parameter is inoperative in the fixed mode. |
| $T_p$ | 36 | Integration-pulse width. |
| $T_x$ | 66 | Time-position number of the single sample group to be integrated in the fixed mode. This parameter must be set to one in the sweep mode. |

Referring to FIG. 3 there is shown the fixed-mode timing diagram. Here the trigger pulse starts the process and after a delay of $T_d + \Delta T(T_x)$, N integrations are obtained.

Delay measurement and display circuits may be included to measure and conveniently display the time delay of a peak that has been located using the search mode. The total time delay is the sum of the value entered on the $T_d$ switch 18 and the value displayed on display counter 70. In the fixed mode the display can also be used to check that portion of the time delay which is entered by the operator using $\Delta T$ and $T_d$ switches. Digital readout 70 indicates the time interval between the termination of the $T_d$ delay and the beginning of the signal integration pulse. If a counter were enabled during all of the N occurrences of this time period for a single sample group and counted the clock, it would accumulate N times the desired number of counts. Therefore, the clock frequency is divided by N counter 72 before being counted by the display counter 70. An alternate method would have been to count the clock directly, only for one of N time periods.

When a peak is detected by peak detector 48, the timing circuits continue to function until all N samples of the active group have been taken. When a peak is detected the value contained in display counter 70 is latched by latch 74 and displayed by display 76. Operation in the fixed mode is identical except that the display counter 70 contents are latched to the display after the Nth sample without the need for peak detection.

The operator of this automatically sweeping circuit can encounter certain difficulties unique to this instrument. One possible difficulty involves the size of the increment spacing $\Delta T$. If $\Delta T$ is larger than the integration pulse width $T_p$ as shown in FIG. 2, the desired signal could fall entirely between two sample groups and thus be missed. Another difficulty involves the use of an inappropriately wide integration pulse $T_p$. If a wide integration pulse is used to search for a very narrow signal pulse, the signal pulse may be missed. This is because the output of the analogue integrator 33 approximates the average of its input during the integration time. If, during most of this integration time the input signal is not present, the signal at the integrator output may not be large enough to be seen by the peak detector. Therefore if a narrow signal pulse is detected an appropriately short integration pulse must be used.

The peak detector hysteresis voltage, $V_h$, must also be properly adjusted with control 80 to insure reliable accurate peak detection. In FIG. 4 there is shown peak detection. The output from a boxcar integrator is not entirely noise free. So an adjustable amount of hysteresis voltage, $V_h$, must be provided in the peak detector as shown in FIG. 4. This $V_h$ is required because the integrator 33 output contains some residual noise, and the voltage drops due to noise must be separated from voltage drops due to true signal peaks. If $V_h$ is too small, the noise will cause false peak indications. However, this hysteresis also introduces amplitude and timing errors into the measurement as shown in FIG. 4 so that if $V_h$ is too large the amplitude of timing errors may become unacceptably large. Therefore $V_h$ should be adjusted to the smallest possible value that will prevent noise spikes from producing false peak indications. This requires that $V_h$ be readjusted whenever the number of integrations per sample group N is changed since N affects the signal to noise ratio of the integrator output. The timing error shown in FIG. 4 is much greater than, but proportional to, the error in the displayed time delay during the duration of the integrator output pulse and is proportionally lengthened relative to the duration of the input signal pulse.

These timing and amplitude errors can be greatly reduced by making a second sweep starting slightly before the time delay indicated, using a large N, small $V_h$, small $\Delta T$ and small $T_p$. Use of these settings when initially searching for the peak may not be practical because of the large amount of time such settings require in order to search through a large range of time delays. Once the peak has been localized, the time required for a more careful search through a small range of time delays is not excessive and will produce more accurate results.

The embodiments of the invention in which an exclusive property or privilege is claimed are defined as follows:

1. An automatically sweeping circuit for searching for an evoked response in an output signal in time with respect to a trigger input, comprising:

a clock developing a pulsed output, a $\Delta T$ counter coupled to said clock and the input and being responsive to a trigger input to develop a $\Delta T$ output signal corresponding to the number of pulses applied to said $\Delta T$ counter thereafter, a $\Delta T$ comparator coupled to said $\Delta T$ counter and responsive to said $\Delta T$ output signal to develop an output of a first state and to reset said $\Delta T$ counter with said $\Delta T$ output signal equal to a predetermined $\Delta T$ value, a $T_p$ counter coupled to said clock and said $\Delta T$ comparator and being responsive to said $\Delta T$ comparator's output being at said first state to develop a $T_p$ output corresponding to the number of pulses applied to said $T_p$ counter thereafter, a $T_p$ comparator coupled to said $T_p$ counter and being responsive to said $T_p$ output signal to develop an output of a first state with said $T_p$ output signal equal to a predetermined value, detection means coupled to the output signal and said $\Delta T$ and $T_p$ comparators and being responsive to said $\Delta T$ comparator's being at said first state to begin a search for the response in said output signal and being responsive to said $T_p$ comparator's output being at said first state to cease searching for said response after a time period $T_p$, control means coupled to said $T_p$ comparator and said $\Delta T$ and $T_p$ counters to allow for a new sweep with the next trigger pulse and $T_p$ counters and being responsive to said $T_p$ comparator's output being at said first state to reset said $\Delta T$, an N counter coupled to the input and responsive thereto to develop an N output signal corresponding to the number of input triggers, an N comparator coupled to said control means and said N counter and responsive to said N output signal to develop an output of a first state and to reset said N counter with said N output signal equal to a predetermined value, an n counter coupled to said $\Delta T$ comparator and responsive to said $\Delta T$ comparator's output to develop an n output signal corresponding to the number of times said $\Delta T$ comparator's output assumes said first state, a $T_x$ counter coupled to said N comparator and responsive to said N comparator's output to develop a $T_x$ output signal corresponding to the number of times said N comparator's output assumes said first state, and a $T_x$ comparator coupled to said $T_x$, n and $T_p$ counters, and being responsive to the output count of said $T_x$ counter being one less than the output count of said n counter to develop an output of first state, said $T_p$ counter being responsive to said $T_x$ comparator's output assuming said first state to develop said $T_p$ output signal thereafter.

2. The circuit of claim 1 further including $T_d$, $\Delta T$, $T_p$ and N switches coupled to the $T_d$, $\Delta T$, $T_p$ and N comparators respectively for inputting to said comparators the predetermined value compared by each comparator.

3. The circuit of claim 2 further including an n switch, and an n comparator coupled to said control means, said n counter and n switch and being responsive to said n output equal to the value input to said n comparator by said n switch, said control means being responsive to said n comparator's output being at said first state to cease the sweep.

4. The circuit of claim 3 further including background control means for obtaining a background search coupled to said $T_p$ comparator, said $T_p$ counter and said detection means and being responsive to said $T_p$ comparator's output assuming said first state to begin a second search of the output signal lasting a time period $T_p$ after completion of said first search.

5. The circuit of claim 4 wherein said detection means includes a boxcar integrator.

6. The circuit of claim 4 further including a peak detector coupled to said integrator and display means coupled to said peak detector and said N comparator for displaying data relative to detected peaks.

* * * * *